Figure 1:
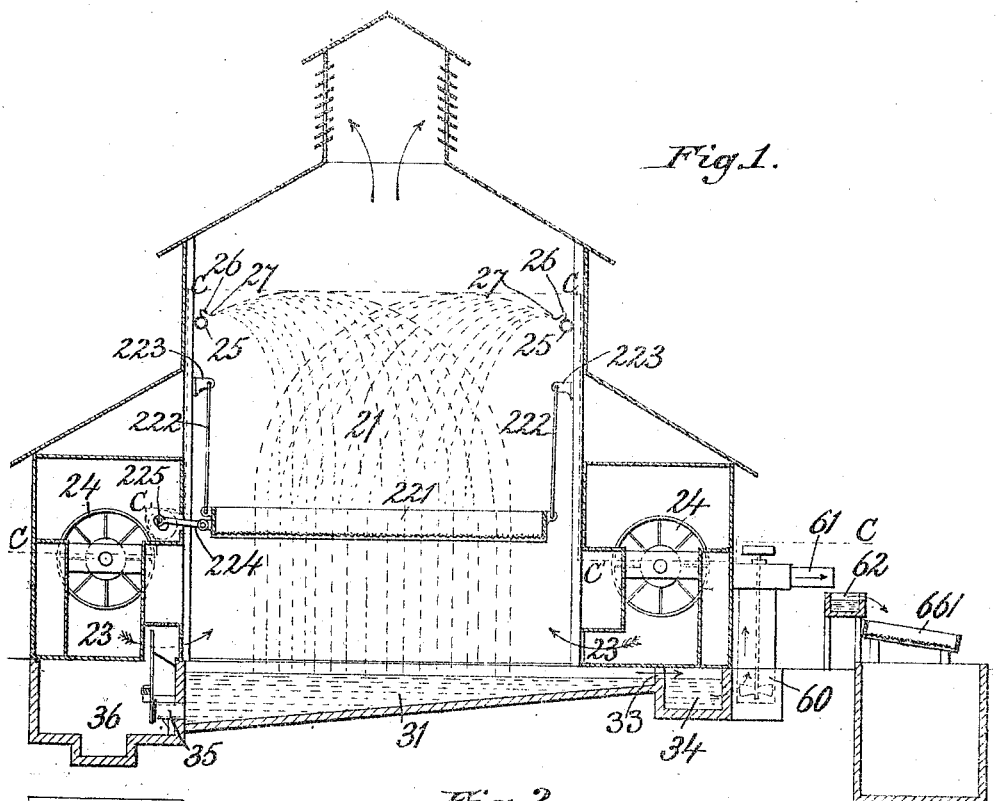

H. FRASCH.
SALT MAKING.
APPLICATION FILED DEC. 13, 1899. RENEWED FEB. 21, 1908.

1,006,195.  
Patented Oct. 17, 1911.

Attest:  
H. C. Schott  
Anton Gletzner

Inventor  
Herman Frasch  
by Chas. J. Hedrick  
his attorney

UNITED STATES PATENT OFFICE.

HERMAN FRASCH, OF NEW YORK, N. Y., ASSIGNOR TO THE UNITED SALT COMPANY, OF CLEVELAND, OHIO, A CORPORATION OF OHIO.

SALT-MAKING.

1,006,195.      Specification of Letters Patent.      Patented Oct. 17, 1911.

Application filed December 13, 1899, Serial No. 740,233. Renewed February 21, 1906. Serial No. 302,268.

*To all whom it may concern:*

Be it known that I, HERMAN FRASCH, a citizen of the United States, residing at the city of New York, borough of Manhattan, county of New York, in the State of New York, have invented certain new and useful Improvements in Salt-Making; and I do hereby declare the following to be a full, clear, and exact description of the invention.

This invention relates more particularly to the manufacture of salt by processes in which previously made particles of salt are exposed to showers or to currents of brine in such manner as to form larger or more solid lumps; but it also has reference to processes in which all the salt is formed in such showers or currents. Instead of placing the salt in a shower or a current of brine, the salt can be moved in or in and out of a bath of brine.

The invention includes the salt produced in each of the varieties, as well as the process or processes of producing the same.

In my prior application for salt-making, filed November 13, 1899, No. 736,842, I have described a process in which nearly saturated brine, most advantageously at superatmospheric temperature as near the boiling point of the brine as may be practicable and economical with the available means of heating, is exposed unsupported in drops to an evaporation-promoting atmosphere in a large room in which the air is constantly renewed; and in which application further supersaturated brine obtained as a result of such exposure is run over a salt-growing bed at such speed and in such volume that the fine particles of salt are carried away by the current. The evaporation of the brine in drops may be such as not only to form a supersaturated brine, but also to precipitate salt in the drops. On standing sufficiently quiet to allow fine salt to settle, the supersaturated brine precipitates a coarse salt which collects on the bottom of the brine-holding vat. On running over the salt-growing bed, the brine precipitates a compact salt, which grows in columns upon the said bed and which can be made very hard by drying as in said application described. The fine salt which is carried away by the current flowing over the bed can be recovered by allowing the brine holding the same in suspension to stand in a settling vat.

In accordance with the present invention, any of four kinds of salt mentioned, or any other granular salt, most advantageously coarse salt from the first mentioned vat, is exposed in particles of suitable size to the showers of brine drops in the large room before mentioned.

According to one form of the invention the granular salt is exposed in a layer, in which case the showered brine unites the grains of salt into a cake. According to another form of the invention the granular salt is exposed loosely under such agitation as will prevent the adhesion to one another of the salt particles, in which case the salt grains increase in size without uniting into a cake. In both cases, the original salt grains (pieces or particles) become incrusted with the deposit from the showered brine.

For the exposure the salt is placed upon a perforated or permeable receiver, most advantageously a sieve of galvanized wire cloth or of canvas stretched in a frame. When a layer of salt is treated, there is no need of shaking the receiver. The drops fall upon the bed or layer; and other salt precipitates or grows upon the salt forming said bed or layer. The exposure to the drops can be continued until the accretion forms, with the original particles, so solid a bed that, on drying in lumps or as a whole, the original particles become cemented firmly together. The drying can best be performed in lumps as described in my said application.

Instead of continuing the exposure to the drops for so long a time, and then drying the resultant mass, the receiver with its load can be withdrawn at any suitable time and the layer disintegrated into pieces which correspond with the original particles, but are heavier, or into still smaller pieces. The disintegration can be effected by any of the means heretofore employed to separate granular material which may have become caked; and, if desired, the layer can be run through a mill with the aid of brine as described in my said application.

When it is desired to expose the salt in a loose state, the receiver can be so lightly charged that agitation of the same will cause the salt particles to move to and fro and thus prevent their adhesion.

Instead of exposing the coarse salt from the first mentioned vat, or other previously made salt, to the shower of brine drops, they can be exposed to a current of brine, by placing the perforated receiver with its load of previously made salt so that a current of supersaturated brine can flow through it, with or without at the same time flowing over it. For example, the receiver can be placed with its perforated portion in an inclined position and be supplied from a trough, receiving the overflow of supersaturated brine from the first mentioned vat. The larger portion of the brine may flow over the receiver; but some will pass through it.

Instead of exposing the perforated receiver loaded with previously made salt to the shower of drops or to the current of brine, it can be so exposed in an empty condition, so that the salt is formed thereon, which is afterward exposed to the brine. Other objects can be exposed to the showers of drops, in order that there may be an accretion of salt thereon.

In exposing coarse salt from the first mentioned vat, it may be ground before exposure or it can be exposed in the unground condition. It is characterized by being in skeleton forms, unless in case of the ground salt such forms shall have been destroyed by the grinding operation. These skeleton forms, instead of being filled out cubes or other solid figures, contain cavities or hollows therein. They are composed largely of plates united together at angles of 120 degrees.

Figure 2:
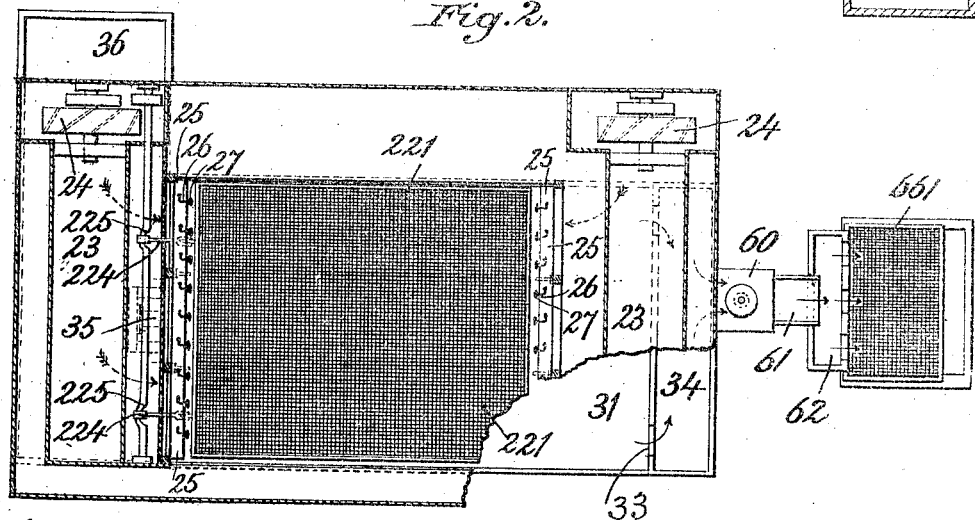

In the accompanying drawings: Figure 1 is a sectional elevation, and Fig. 2 a sectional plan (partly broken away) of apparatus which can be used to carry the invention into effect. The section of Fig. 2 is on line C C of Fig. 1.

As shown, the large room 21 is provided near its top with horizontal pipes 25, one on each side; and at intervals on this pipe are jet nozzles 26, each with a spatter plate 27 in front of it. Heated and nearly saturated brine is supplied to said pipes 25 from any suitable source (not shown) and is projected in the form of jets from the several nozzles 26 against the spatter plates 27, which break up the jets into showers of brine drops that fall through the atmosphere of the room 21. Sprinklers of other forms could be used.

The atmosphere of room 21 is constantly renewed by fresh air, which is driven in through the ducts 23 by the fans 24. The moisture laden air escapes by the openings in the roof.

At the floor of the room 21 there is a vat 31 provided with overflows 33 into a trough 34 and also with a draw-off 35 normally closed and, when open, discharging into the conduit 36. For the more ready discharge of its contents, the floor of the vat 31 is inclined downward to the draw-off 35; but a level floor could be used.

The vat 31 receives the brine which has been delivered in showers into the room 21 by the sprinklers 26—27; and said brine escapes from said vat by the overflows 33 into the trough 34, from which it is delivered by a cataract pump 60 and trough 61 to the distributing trough 62.

As thus far described, the drawing shows nothing not found in my before mentioned application and consequently nothing to be claimed in this patent which is to be considered as subsequent in legal effect to that on my said prior application 736,842, and as being tributary thereto, so far as the two patents contain subject-matter in common.

The perforated or permeable receivers 221 and 661 are, however, not found in said prior application. They are best made each of galvanized wire cloth or canvas stretched in a frame. The receiver 221 is shown as suspended by links 222 jointed to the receiver and also to the brackets 223, so that the receiver can be reciprocated, and as connected by pitmen 224 with cranks 225 for imparting reciprocation.

By placing a light charge of granular salt of any description on the sieve or receiver and reciprocating or shaking the latter by the crank and pitman, or in any suitable way, the particles of salt are prevented from adhering while they grow in size by accretion from the brine which is showered in the room 21 from the sprinklers 26—27. The brine drops fall upon the salt grains in the receiver 221 and each grain of the original salt grows from the salt which deposits thereon from the brine. The constant agitation of the receiver prevents the adhesion to one another of the salt grains.

It will be understood that evaporation from the brine begins as soon as it escapes from the sprinkler nozzles 26 and continues while it is falling in drops through the atmosphere of room 21 and is trickling over the salt grains in the receiver 221.

The operation can be continued until the individual grains of salt are as large as marbles or larger, if desired; but, of course, need not be continued so long. When the grains have grown to the size desired, the showers of brine are stopped and the salt removed and utilized, with or without being broken up or ground, as may be preferred.

The brine which drips from the receiver 221, while the showers are falling, collects in the vat 31 and deposits therein a coarse salt, whereof the grains are not filled out, but consists largely of plates united together at an angle of 120 degrees. It is most advantageous to charge the receiver 221 with this salt, which can be separated by a sieve of proper mesh from any fine salt that may precipitate or settle with it. By the deposit from the falling brine the skeleton grains become filled out and assume the form of more or less spherical lumps or balls. As before said, however, any other salt in small masses, granules or pieces which allow of proper agitation to prevent their adhesion together can be used.

Should it not be desired to obtain the salt in the roundish lumps or balls, which result from the exposure with agitation of previously made salt to the showers of brine, the bottom of the receiver 221 may be covered with a layer of the before mentioned coarse skeleton salt, or of any other salt, to such depth as may be considered expedient, say, a depth somewhat less than the thickness of the block of salt desired. The brine showers being then produced, the drops of brine fall upon the layer of previously made salt in the receiver 221 and percolate through it, until by the deposit of salt the whole layer is converted into a block of salt. The brine, after thus depositing salt in the receiver 221, continues its descent into the vat 31. The receiver during the operation may remain stationary. The showers being stopped, the salt block is removed from the receiver; and the salt is dried as a block or after being first broken up into lumps or pieces of any desired size or form. It may be ground in a mill to the desired degree of fineness.

The perforated or permeable receiver 661 is shown as supported in an inclined position below the overflow notches in the side of the trough 62, which receives through the trough 61 from the pump 60 the overflow of supersaturated brine from the vat 31. This receiver 661 is supplied with a layer of salt most advantageously of the coarse skeleton salt which deposits on the floor of vat 31, but it may be of any other salt. The current of brine from trough 62 flowing over and through the layer of salt on the receiver 661 deposits salt in and on said layer so that a block is formed. This can then be removed and dried, with or without first being broken up or ground.

Instead of supplying the receivers 221 and 661, either or both, with previously made salt, they could be exposed in an empty state to, respectively, the showers of brine drops in the room 21 or to the current of brine flowing from trough 61. On such exposure a growth of salt will start and continue until a block will be obtained. This can be removed and dried, with or without being broken up or ground previous to the drying operation.

The brine which runs off from the receiver 661 can be heated, with or without injection of steam, so that said brine becomes a little below saturation at the temperature given; and in this condition it can be showered again in the room 21.

The coarse skeleton salt can be raked out of the brine in the vat 31, or the brine can be run off by the draw-off 35, leaving the salt on the vat floor.

I claim as my invention or discovery:

1. The improvement in the manufacture of salt, by exposing previously formed coarse granular salt to incrusting brine in progressive motion, substantially as described.

2. The improvement in the manufacture of salt, by exposing previously formed granular salt to showers of incrusting brine, substantially as described.

3. The improvement in the manufacture of salt, by exposing previously formed granular salt on a receiver through which the brine can pass to incrusting brine in progressive motion transverse to said receiver, substantially as described.

4. The improvement in the manufacture of salt, by preliminarily making salt in the form largely of coarse skeleton grains which consist of plates united together at an angle and exposing such salt to incrusting brine in progressive motion, substantially as described.

5. The improvement in the manufacture of salt, by preliminarily making salt in the form largely of coarse skeleton grains which consist of plates united together at an angle, and exposing such salt to showers of incrusting brine, substantially as described.

6. The improvement in the manufacture of salt, by exposing salt on a receiver through which the brine can pass to incrusting brine in progressive motion transverse to said receiver, substantially as described.

7. The improvement in the manufacture of salt, by exposing granular salt to showers of incrusting brine, substantially as described.

8. Salt composed of two formations, one of them existing as incrustation on and around the grains of the other and exhibiting a different structure from that of the incrusted grains, substantially as described.

9. Salt composed of two formations, one of them existing as incrustation on grains of the other, which latter consist largely of plates united together at an angle, the incrustation occupying the spaces bounded on two adjacent sides by said plates, substantially as described.

10. The improvement in the manufacture of salt, by exposing previously formed granular salt to incrusting brine and causing a movement of one of said materials with respect to the other of them, the so exposed salt being largely in the form of coarse skeleton grains which consist of plates united together at an angle, substantially as described.

In testimony whereof I affix my signature, in presence of two witnesses.

HERMAN FRASCH.

Witnesses:
F. W. LOTHMAN,
J. C. UPDEGROVE.